US008845232B2

(12) United States Patent
Borden

(10) Patent No.: US 8,845,232 B2
(45) Date of Patent: Sep. 30, 2014

(54) PRODUCT AND METHOD FOR TREATMENT OF SOIL CONTAMINATED WITH ENERGETIC MATERIALS

(76) Inventor: Robert C. Borden, Raleigh, NC (US)

( * ) Notice: Subject to any disclaimer, the term of this patent is extended or adjusted under 35 U.S.C. 154(b) by 218 days.

(21) Appl. No.: 13/323,345

(22) Filed: Dec. 12, 2011

(65) Prior Publication Data

US 2012/0148347 A1 Jun. 14, 2012

Related U.S. Application Data

(60) Provisional application No. 61/421,975, filed on Dec. 10, 2010, provisional application No. 61/447,676, filed on Feb. 28, 2011.

(51) Int. Cl.
*B09C 1/00* (2006.01)
*B09C 1/02* (2006.01)

(52) U.S. Cl.
CPC ...................................... *B09C 1/02* (2013.01)
USPC ................................ 405/128.15; 405/128.75

(58) Field of Classification Search
USPC ................ 405/128.15, 128.45, 128.5, 128.75
See application file for complete search history.

(56) References Cited

U.S. PATENT DOCUMENTS

| 5,202,033 | A | | 4/1993 | Stanforth |
| 5,387,271 | A | | 2/1995 | Crawford et al. |
| 5,520,482 | A | * | 5/1996 | Oeste et al. ................... 405/263 |
| 5,582,627 | A | * | 12/1996 | Yamashita ....................... 71/26 |
| 5,846,434 | A | | 12/1998 | Seaman |
| 6,042,629 | A | * | 3/2000 | McGarrity ........................ 71/25 |
| 6,066,772 | A | * | 5/2000 | Hater et al. ................... 71/64.08 |
| 6,268,205 | B1 | | 7/2001 | Kiest |
| 6,398,960 | B1 | | 6/2002 | Borden |
| 7,138,060 | B2 | | 11/2006 | Cuthbertson |
| 7,204,660 | B2 | * | 4/2007 | Shulgin et al. ........... 405/128.75 |
| RE40,448 | E | | 8/2008 | Borden |
| 7,785,468 | B2 | | 8/2010 | Baseeth |
| 7,928,277 | B1 | | 4/2011 | Cox, Jr. |
| 8,178,743 | B2 | * | 5/2012 | Britto et al. ................... 588/318 |
| 2005/0054030 | A1 | | 3/2005 | Schnoor et al. |
| 2008/0032382 | A1 | * | 2/2008 | Schnoor et al. ............ 435/252.3 |
| 2008/0273925 | A1 | | 11/2008 | Borden |
| 2011/0139695 | A1 | | 6/2011 | Borden |

FOREIGN PATENT DOCUMENTS jp      58208191       * 12/1983

OTHER PUBLICATIONS

NATO Science Series, Use of Humic Substances to Remediate Polluted Environments: From Theory to Practice, 185-200, 233-65, 311-28, 353-64, vol. 52, 2005, Springer, U.S.A.
H.K. Boparai et al, Remediating Explosive-Contaminated Groundwater by in situ Redox Manipulation (ISRM) of Aquifer Sediments, 2007, University of Nebraska—Lincoln, U.S.A.
Robert C. Borden, Organic Substrate Addition as a Range Best Management Practice, 2011, Strategic Environmental Research and Development Program, U.S.A.
Robert C. Borden et al, Use of Organic Substrates as a Best Management Practice for Active Ranges, 2011, Strategic Environmental Research and Development Program, U.S.A.

* cited by examiner

*Primary Examiner* — John Kreck
(74) *Attorney, Agent, or Firm* — Olive & Olive, P.A.

(57) ABSTRACT

Exemplary products and methods are described for in situ treatment of soil that is or may become contaminated with energetic materials or their degradation products. Easily biodegradable organic material and humic material may be distributed on the soil surface in a manner such that portions thereof are carried below the soil surface by infiltrating water, where the easily biodegradable material may be degraded by microorganisms, generating an anaerobic environment suited to further biologic and abiotic reduction of the contaminants, and the humic material may be retained by the soil particles thereby reducing pollutant leaching.

11 Claims, 3 Drawing Sheets

US 8,845,232 B2

PRODUCT AND METHOD FOR TREATMENT OF SOIL CONTAMINATED WITH ENERGETIC MATERIALS

PRIORITY

This non-provisional application claims priority from two provisional applications: U.S. Ser. No. 61/421,975 filed Dec. 10, 2010 and U.S. Ser. No. 61/447,676 filed Feb. 28, 2011.

BACKGROUND OF THE INVENTION

1. Field of the Invention

This invention comprises a product and method for the safe in situ treatment of soil that is or may become contaminated with energetic compounds or their degradation products, including propellants, explosives, and pyrotechnics that can pose fire or explosion risks during treatment by other methods.

2. Description of the Related Art

Routine activities at grenade, mortar, artillery, and bombing ranges and open burn/open detonation (OB/OD) areas often result in accumulation of residues of energetic materials in the upper few centimeters of soil. These areas often have disturbed topography with craters, exposed soil, and limited vegetative cover, which increases infiltration and leaching of contaminants. Many energetic materials are weakly bound by soil and can be transported to groundwater in high permeability soils.

Surface application and tilling of hydrated lime to a depth of six inches can be effective in reducing leaching of explosives. However, lime treatment has some disadvantages. To be most effective, the lime should be tilled into the soil. This is a major problem in areas with unexploded ordnance, since disturbing the soil could set off an explosion, injuring site workers. To apply this technology at most ranges, the unexploded ordnance must be removed from the soil, at a prohibitively expensive cost, before treatment commences. Additionally, in acidic soils containing alumino-silicates and iron hydroxides, large amounts of lime are required to reach the target pH required for effective hydrolysis. In humid areas, additional steps must be taken: the alkali is gradually leached out of the surface soil, and additional lime must be applied to maintain performance. The high pH required for effective treatment will kill most vegetation and is not practical for large areas.

In an alternative approach, the surface application of a 10-cm thick layer of peat moss amended with soybean oil was shown to be effective in controlling the migration of RDX (Research Department Explosive, Rapid Detonation Explosive or Royal Detonation Explosive), from Composition B detonation residues. RDX and its breakdown product, MNX, were greatly reduced after passage through the pilot-scale soil columns. No other explosive compounds in the detonation residues were detected in the leachate in over 95% of the aqueous samples collected. Unfortunately, this peat-soybean oil approach had significant operational problems that make it impractical for deployment at most ranges and OB/OD areas. Specifically, weapons firing and OB/OD activities can cause the peat to catch fire. Obviously, an increased fire hazard is not acceptable in this type of environment. There are also significant questions about the physical integrity of the peat moss layer and the potential for dust problems in arid areas. To reduce fire hazard and dust, it is possible that the peat-soybean oil layer could be buried. However, burying would not be practical on many ranges due to the very high costs and physical hazards associated with working in an area with unexploded ordnance.

BRIEF SUMMARY OF THE INVENTION

The present invention comprises a product and method for in situ treatment of soil that is or may become contaminated with energetic materials or their degradation products. The method comprises distributing easily biodegradable organic material and humic material on the soil surface in a manner such that easily biodegradable organic material and humic material are carried deeper into the soil by infiltrating water, thereby enhancing pollutant degradation and/or reducing pollutant leaching, as more specifically described hereafter.

Advantages of the invention will be more fully apparent from the following detailed disclosure made with reference to the Figures, and from the claims.

DETAILED DISCUSSION OF THE INVENTION

Figure 1:
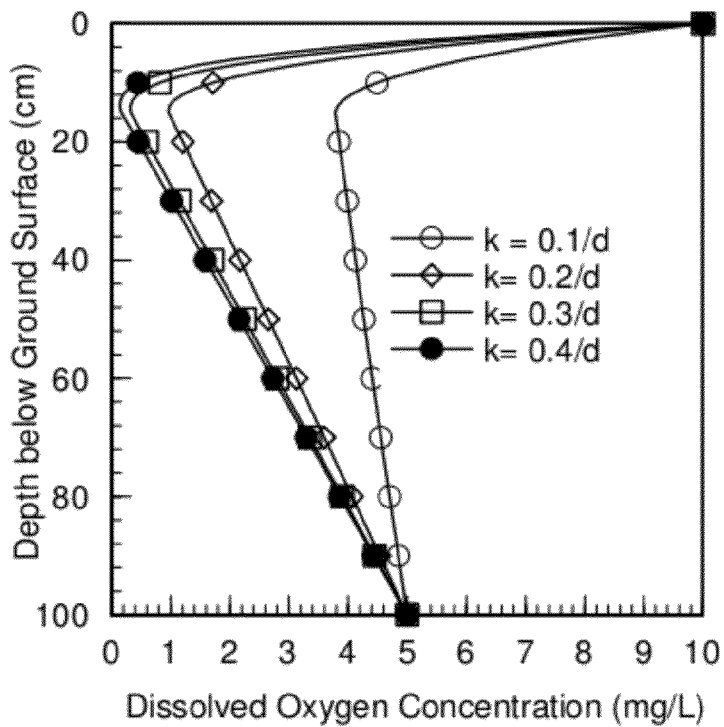
FIG. 1 is a graph showing the simulated vertical distribution of dissolved oxygen in soil with 15 centimeters of biodegradable organic substrate and varying substrate decay rate.

The present invention comprises a product and method for treatment of soil that is or may become contaminated with energetic compounds or their degradation products. The method comprises distributing organic amendments over the soil surface in a manner such that these amendments are then carried deeper into the soil by infiltrating water. For purposes of this application, "energetic materials" are compounds or formulations with a large amount of stored chemical energy that can be rapidly released without an external source of oxygen. The most common energetic materials are propellants, explosives, and pyrotechnics, including but not limited to perchlorates, chlorates, nitrates, picrates, dinitrogen tetroxide, nitroaromatics, 2,4,6-trinitrotoluene (TNT), 2,4-dinitrotoluene (2,4-DNT), 2,6-dinitrotoluene (2,6-DNT), triaminotrinitrobenzene (TATB), nitroamines, 1,3,5-hexahydro-1,3,5-trinitrotriazine (RDX), and 1,3,5,7-tetrahydro-1,3,5,7-tetranitrotetrazocine (HMX), 2,4,6,8,10,12-hexanitro-2,4,6,8,10,12-hexaazaisowurtzitane CL-20), nitrocellulose (NC), nitroglycerin (NG), nitroguanidine (NQ), pentaerythritol tetranitrate (PETN), 1,1-diamino-2,2-dinitroethene (DADNE), 2,4-dinitroanisole (DNAN) and nitrotriazalone (NTO). Significant advantages of the teachings herein include: (1) the organic amendments may be spray applied or distributed from a distance, which reduces the hazard to site workers; and (2) tilling or other disturbance of the soil, that may expose workers to explosion hazard, is not required. Since soil disturbance and unexploded ordnance removal are not pre-requisites to treatment with the inventive method, this method is well-suited for use at sites such as active weapons ranges where live artillery is in use on an ongoing basis, and offers significant savings both in time and money. Even at range sites no longer in use, or used only intermittently, the inventive method is safer and less costly than prior art methods requiring soil disturbance.

The organic amendments used in this invention consist of easily biodegradable organic materials and humic materials. For purposes of this application, "easily biodegradable materials" are materials which are fermented by microorganisms in the soil in which they are applied, under anaerobic conditions and, when the pH of the soil is between 5.0 and 8.0, release hydrogen and acetate as products of their fermentation. In an exemplary embodiment, these materials are transported at least 10 cm into the soil profile by infiltrating water. Transportation of the organic amendments below the soil surface reduces fire hazards, which are a major concern in areas receiving energetic materials. Transportation of the organic amendments below the soil surface also generates more strongly anaerobic conditions, which enhances pollutant attenuation and increases the longevity of the amendment.

Below the soil surface, the easily biodegradable material is biodegraded by microorganisms and thereby generates anaerobic conditions that enhance biological and abiotic reduction of the energetic compounds.

Once anaerobic conditions have been generated in the soil, these conditions stimulate anaerobic biodegradation of the energetic materials and reduction of naturally occurring Fe(III) minerals to Fe(II). The increased levels of Fe(II) will, in turn, enhance abiotic degradation processes. A variety of easily biodegradable materials may be used including, but not limited to, fatty acids, carbohydrates, alcohols, and other soluble organic materials. Desirable materials are low cost, have an aqueous solubility greater than 0.1 grams per gram of water (allowing infiltration into soil), low volatility (i.e. do not readily evaporate at a temperature less than 40 degrees Celsius and greater than 0.9 atmospheres pressure) (reducing air emission), have a flash point above 93 degrees Celsius (reducing fire hazards), have a chemical oxygen demand greater than 0.5 gram per gram, and remain effective (i.e., has not been entirely depleted and such portion as remains continues to biodegrade) for more than one month after entering the subsurface of a soil (reducing application frequency).

Glycerol (glycerin) may be particularly useful in this invention as an easily biodegradable organic material. Glycerol is completely miscible with water so it can be easily spray applied. The fire hazard for glycerol is classified as low due to its relatively high flash point (176° C., as compared to 17° C. for ethanol) and strongly hygroscopic nature (glycerol will absorb water out of the air). Glycerol has a Chemical Oxygen Demand greater than 0.5 grams per gram and is comparatively long-lived in soil due the limited number of organisms (only *Klebsiella, Citrobacter, Enterobacter* and *Clostridium* species) that can ferment glycerol. Other easily biodegradable organic materials that may be useful in this invention include soapstock, corn steep liquor, and a wide variety of food processing wastes.

Below the soil surface, the humic material in this embodiment will enhance pollutant retention and reduce pollutant leaching through one or more of the processes of hydrophobic sorption of energetic material to the soil, enhanced covalent binding of some pollutants, acting as an electron shuttle enhancing abiotic degradation by Fe(II), enhance sorption of heavy metals, and providing a reservoir of reducing power to maintain long-term anoxic conditions.

It is highly desirable that the humic material not only be capable of spray application but also, after migrating into the soil, and then attaching to the soil particles as described above, so that its effectiveness will continue for a longer term than otherwise would be the case. Humic materials that may be used in this embodiment of the inventive process include: (1) humic acid and humic acid salts (humates) chemically extracted from peat and solid humics; and (2) lignin derivatives (LDs) produced during paper production. In the paper manufacturing process, various chemical processes are used to solublize lignin, forming lignin derivatives (LDs) including: (a) hydrolysis lignin produced by strong acid hydrolysis of woody materials; (b) kraft lignin produced through reaction with NaOH and $Na_2S$; (c) lignosulfonates produced through reaction with metal bisulfites and other reagents; and (d) organosolv lignins produced by extraction with ethanol or other organic solvents. Hydrolysis and kraft lignins are soluble at high pH but will precipitate out of solution as the pH is reduced below 8. Lignosulfonates are very soluble and are marketed for a variety of different uses ranging from dust suppression to emulsification to food preparation. There are a variety of lignosulfonates approved by the US Food and Drug Administration (FDA) for direct contact and/or incorporation into food. Lignosulfonates are commonly applied over large areas (roads, helipads) for dust suppression and to crops to enhance fertilizer adsorption.

To enhance anaerobic biodegradation of energetic materials in soils, the dissolved oxygen (DO) of the soil pore water preferably should be reduced to below 0.1 mg/L. However, DO concentrations depend on the rate of oxygen transport into the soil and rate of oxygen consumption by easily biodegradable organic material, humic material, and reduced iron. A numerical model has been developed to evaluate the effect of substrate depth and thickness on pore water dissolved oxygen concentrations. Oxygen transport by gas phase diffusion was simulated by finite differences. Oxygen consumption was modeled by a dual Monod rate expression assuming the biochemical oxygen demand (BOD) of the pore water was 5 mg/L or greater wherever substrate was emplaced.

FIG. 1 shows the effect of the substrate consumption rate on the dissolved oxygen (DO) profile in soil where the surface 15 cm of soil has been treated with biodegradable organic substrate. For this case, the substrate decay rate must be greater than 0.4/d to deduce DO concentrations to less than 0.1 mg/L.

Figure 2:
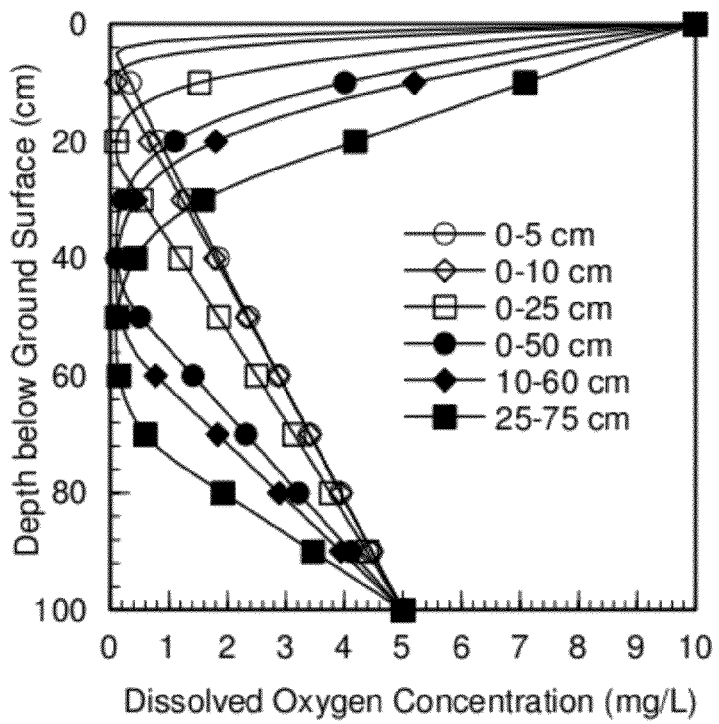
FIG. 2 is a graph showing the simulated vertical distribution of dissolved oxygen in soil treated with varying thickness of biodegradable organic substrate.

FIG. 2 shows simulated DO profiles for varying substrate depths and thicknesses when the substrate decay rate is varied to generate a minimum DO less than 0.1 mg/L. The substrate thickness should be selected so the minimum dissolved oxygen concentration is no greater than 0.1 mg/L to enhance anaerobic biodegradation. DO concentrations below 0.1 mg/L can be achieved by using organic substrates with higher substrate decay rates. However, this increases the rate of substrate consumption and requires more frequent replenishment.

Figure 3:
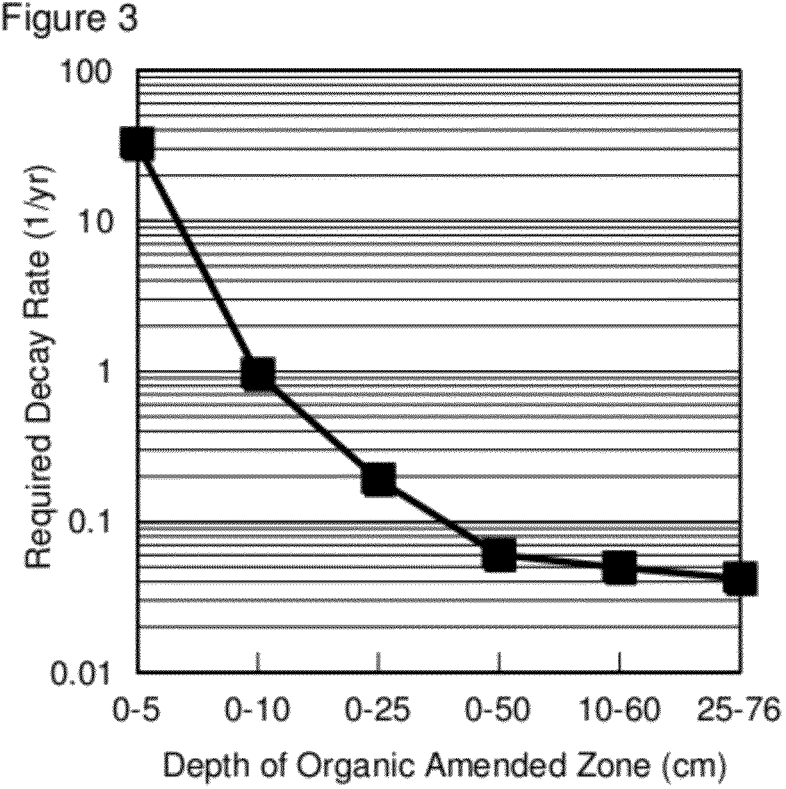
FIG. 3 is a graph showing the substrate decay rate for different substrate thicknesses to generate a minimum dissolved oxygen concentration of 0.1 milligrams/liter to enhance anaerobic biodegradation.

FIG. 3 shows the substrate decay rate used in the FIG. 2 simulations.

Figure 4:
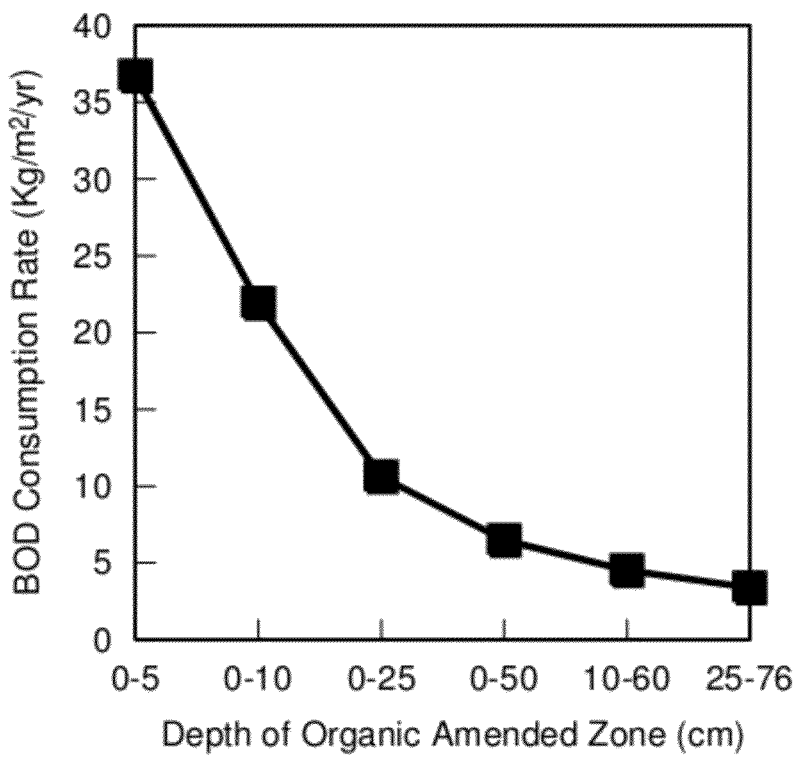
FIG. 4 is a graph showing the biochemical oxygen demand (BOD) consumption rate for different substrate thicknesses that will generate a minimum dissolved oxygen concentration of 0.1 milligrams/liter to enhance anaerobic biodegradation.

FIG. 4 shows the resulting substrate consumption rate for each of the FIG. 2 simulations. When a thin layer of organic substrate is placed on the soil surface, the DO gradient is very steep, resulting in rapid oxygen transport and requiring a very high substrate decay rate to reduce DO to less than 0.1 mg/L. This high substrate decay rate results in rapid consumption of the added substrate and frequent replenishment to maintain performance, which significantly increases the required maintenance and costs. However, when the substrate is distributed over a greater thickness or placed below the soil surface, the DO gradient is less steep, which reduces the oxygen transport rate and resulting substrate consumption rate and thereby reduces maintenance frequency and costs. The results depicted in FIG. 4 show a clear benefit when the organic substrate extends from the surface to at least 25 cm below the surface with the majority of the organic substrate present at a depth of over 10 cm below the soil surface. The BOD consumption rate is further reduced when the substrate amended zone is 50 cm thick and extends from 10 to 60 cm below the soil surface.

In the preferred embodiment of this invention, the humic materials are dissolved, suspended, or emulsified in water so as to be transported at least 10 cm into the soil profile. However once transported below the surface, the humics must bind to the soil, precipitate and/or attach to the soil. These objectives can be achieved using several different approaches.

In a first approach, humates, hydrolysis lignin, lignosulfonates, and similar materials may be easily dissolved in water and spray applied to the soil surface. Once these materials enter the soil, they will sorb or exchange onto iron oxides and clay particle surfaces and be temporarily immobilized. Over time, these materials will be biologically transformed, significantly reducing their mobility. Biological conversion will be enhanced by the presence of the easily biodegradable material, which will generate anaerobic conditions, stimulating reduction or removal of sulfonate and hydroxyl groups, causing the humic material to be retained by the soil.

In a second approach, kraft lignin (KL), which is soluble at high pH and insoluble at neutral to low pH, may be used. A KL solution may be prepared at a high pH using a base (e.g., NaOH, KOH, or $Ca(OH)_2$) and a commercial lignin powder (e.g., Indulin AT from MeadWestvaco), or may be purchased as an aqueous solution, for example from a paper mill. The solution may be applied to the soil surface by spraying and then be allowed to infiltrate. As the high pH solution infiltrates into the soil profile, the natural acidity of the soil causes the pH to drop and the KL to precipitate on the soil. The depth of KL penetration may be increased by providing additional base. If desired, KL treatment could be combined with surface lime application to treat energetic materials through alkaline hydrolysis, sorption, and biodegradation. In addition to the raw kraft lignins, there are a variety of KLs that have been sulfonated to increase their solubility, generating materials with characteristics intermediate between kraft lignins and lignosulfonates. These materials may be dissolved at pH 7-9 but will precipitate when the pH is dropped below 6.

In a third approach, organosolv lignin (OL), which has a low solubility in water but can be suspended or emulsified using traditional surfactants or lignosulfonates, may be used. The emulsion or suspension may be applied onto the soil surface by spraying and then be allowed to infiltrate. As the droplets or particles are transported through the soil pores, they collide with the soil particles and are retained.

In an exemplary embodiment, an inventive product or products may be prepared containing one or more easily biodegradable organic materials and humic materials. The products are prepared as a concentrated liquid or dry powder to reduce transportation costs. The products may be packaged in bags, drums, and totes or delivered in tanker trucks as appropriate. Once delivered to the site, the products are mixed with water and then spray applied. However in other embodiments, the biodegradable and humic materials may be delivered and applied separately. In some embodiments, sufficient water is added to reduce the viscosity of the mixture to less than 10 centipoise, to aid in spray application and infiltration below the soil surface.

The inventive products may be applied using several different application approaches at sites receiving energetic materials, such as grenade, mortar, artillery and bombing ranges and open burn/open detonation (OB/OD) areas. In most cases, the amendments are spray applied using a hydroseeder, water cannon, or similar equipment. In humid areas, naturally occurring water application (typically, rainfall) may be allowed to infiltrate the amendment into the soil profile. In more arid areas, irrigation water may be used to transport the amendment into the soil profile. Additional amendments may be periodically applied to maintain performance. The reapplication frequency to maintain the requisite levels may be determined based on monitoring of small test plots that are near, but not within, the active range.

On small and moderate size ranges, the spray equipment may be located on the perimeter of the range, outside areas with unexploded ordnance. This would completely eliminate the costs and physical hazards associated with personnel entering a range with unexploded ordnance.

Figure 5:
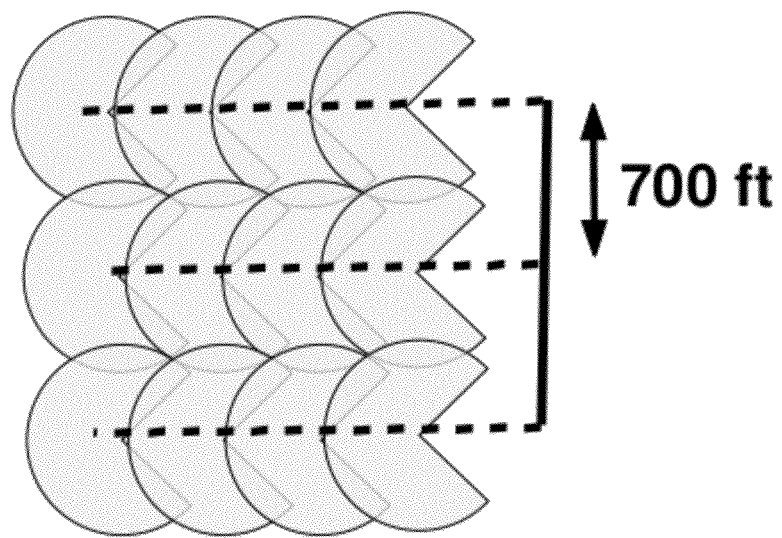
FIG. 5 shows an exemplary distribution of amendment solution in a 100 acre area to be treated.

On large ranges, narrow corridors may be cleared of unexploded ordnance to allow installation of distribution pipes. FIG. 5 shows such an embodiment of the inventive process to treat a large range by distributing the amendment solution over a roughly 100 acre area. In this embodiment, three distribution pipes, spaced 700 ft apart, are placed in the treatment area and connected to a central supply pipe. The amendment solution may be spray applied throughout the treatment area, using water cannons with a 700 ft radius of influence, for example. By reducing the area of unexploded ordnance clearance, worker exposure and unexploded ordnance clearance costs are greatly reduced. For the 100 acre area shown in FIG. 5, it is anticipated that unexploded ordnance clearance costs (based on present pricing) would be reduced by approximately 99%, or $2 million.

On ranges that are routinely cleared, it is likely that only relatively small areas around the cleared unexploded ordnance need to be treated. In this case, the explosive ordnance disposal (EOD) team first would clear the unexploded ordnance and then would make a single application of the amendment in a circle surrounding the former unexploded ordnance location. The application radius would be determined based on the size and type of ordnance and expected zone of explosive dispersal. Again, a hydroseeder or similar type of equipment may be used to perform the application.

The features of the present invention will be more clearly understood by reference to the following examples, which are not to be construed as limiting the invention.

EXAMPLE 1

Corn Steep Liquor & Humate

In an embodiment of the inventive process, a dry powder product may be prepared by blending 30% to 70% corn steep liquor powder (available from Qingdao Abel Technology Co., Ltd) and 30% to 70% soluble humates (e.g., Dry Soluble 80 from Black Earth) and packaged in 20 Kg bags. These bags may be transported to a training range where they are stockpiled prior to use. Once the unexploded ordnance is cleared, the EOD team may then mix one 20 Kg bag per 55 gallon drum of water and spray apply the amendment solution in a circle around the cleared ordnance. The corn steep and humate is then allowed to soak into the soil, generating anaerobic conditions, which enhances anaerobic biodegradation and sorption of any explosive residues. Amendment infiltration preferably should be concentrated in the bottom of the explosion craters where residues are most concentrated.

EXAMPLE 2

Glycerol & Kraft Lignin

In a second embodiment of the inventive process, a concentrated liquid product may be prepared by blending 40% to 60% liquid kraft lignin (e.g., Indulin AT from MWV) and 40% to 60% glycerol, preferably waste glycerol produced during biodiesel production. The kraft lignin used in this embodiment is prepared at high pH at a paper mill to keep the lignin in solution. The waste glycerol used in this embodiment has a high pH associated with NaOH or KOH carry over from the biodiesel production process. These materials may be blended and then delivered in a tanker truck for immediate treatment of, for example, a grenade range. At the range, the delivery truck may be parked at the edge of the range. The product may then be pumped directly out of the truck and spray applied over the ground surface using a high pressure (e.g., 100-150 psi) centrifugal pump. Once application of the concentrated liquid product has been completed, sufficient irrigation water may be spray-applied over the surface of the product to carry the product into the soil. For example, one inch of irrigation water may be spray-applied. In that case, if the soil has a twenty-five percent porosity, one inch of the product as initially applied would saturate four inches of soil. Once the water application has been completed, the soil would drain down to field capacity, causing the product to be spread out over the upper eight inches of soil. Application of additional water would move the amendment further into the soil. This treatment should be sufficient to prevent leaching of explosives to groundwater for one to three years and no clearance of ordnance would be required.

EXAMPLE 3

Lignosulfonate

In a third embodiment of the inventive process, unfermented dry powdered lignosulfonates may be obtained containing soluble sugars. The dry powder may be delivered to the OB/OD area, diluted at 1 part powder to 5 parts water, and spray applied using, for example, a hydroseeder. If the soluble sugars are less than 30% by weight, easily biodegradable soluble organic waste products may be obtained from nearby food manufacturing plants (e.g., whey from dairies, malt from breweries) and spray applied.

The foregoing details are exemplary only. Other modifications that might be contemplated by those skilled in the art are within the scope of this invention, and are not limited by the examples illustrated herein.

What is claimed is:

1. An in situ method for reducing contamination caused by energetic material, comprising:
   a) distributing easily biodegradable organic material and humic material on top of soil contaminated with energetic materials;
   b) applying water to the soil surface, in situ,
      i) in an amount sufficient to transport at least a portion of the organic material and humic material into the soil and sufficient that, in combination with any naturally occurring water application, the organic material and humic material distributed on top of the soil surface will be transported at least 10 cm into the soil, and
      ii) in a manner such that after application of the water and the any naturally occurring water application, the majority of the humic material distributed on top of the soil surface is transported to and retained below the soil surface; and
   c) wherein said humic materials comprise at least one of sulfonated lignins and organosolv lignins.

2. The method according to claim 1, wherein at least a part of the water applied to the soil surface contains at least one of the easily biodegradable organic material and the humic material.

3. The method according to claim 1, wherein at least a part of the water applied to the soil surface contains both the easily biodegradable organic material and the humic material.

4. The method according to claim 1 wherein the humic material comprises a suspension prepared with a surfactant.

5. The method according to claim 1 wherein the humic material comprises an emulsion prepared with an emulsifier.

6. The method of claim 1, wherein said easily biodegradable organic materials are transported at least 25 cm into the soil by said water.

7. The method of claim 1, wherein said easily biodegradable material is at least one of glycerol, soap stock, corn steep liquor and food processing wastes.

8. The method of claim 1, wherein the easily biodegradable organic material and humic material are distributed as a dry powder mixed amendment comprised of 30%-70% of easily biodegradable organic material and 30%-70% of humic material.

9. The method of claim 1, wherein the easily biodegradable organic material and humic material are distributed as a liquid product amendment comprising a mixture of 40%-60% of easily biodegradable liquid organic materials and 40%-60% liquid humic material.

10. An in situ method for reducing contamination caused by energetic material, comprising:
    a) distributing an amendment made up of easily biodegradable organic material and humic material on top of soil contaminated with energetic materials in an amount effective to penetrate at least 10 cm into the soil to create conditions effective to enhance biodegradation of energetic materials in the soil;
    b) applying water to the soil surface having the amendment distributed thereon, in situ, in an amount sufficient to transport the amendment at least 10 cm into the soil and for the amendment to be retained below the soil surface and effective to enhance biodegradation of energetic materials; and
    c) wherein said humic materials comprise at least one of sulfonated lignins and organosols lignins.

11. The method of claim 10, wherein the soil contaminated with energetic materials also contains degradation products of the energetic materials.

* * * * *